United States Patent
Yamamoto

(10) Patent No.: US 10,974,215 B2
(45) Date of Patent: Apr. 13, 2021

(54) FLUID MIXING DEVICE

(71) Applicant: ASAHI YUKIZAI CORPORATION, Nobeoka (JP)

(72) Inventor: Takashi Yamamoto, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 261 days.

(21) Appl. No.: 16/031,471

(22) Filed: Jul. 10, 2018

(65) Prior Publication Data
US 2019/0015802 A1  Jan. 17, 2019

(30) Foreign Application Priority Data

Jul. 11, 2017 (JP) .............................. JP2017-135210

(51) Int. Cl.
| | |
|---|---|
| B01F 15/00 | (2006.01) |
| B01F 15/04 | (2006.01) |
| B01F 5/04 | (2006.01) |
| F16K 7/04 | (2006.01) |
| F16K 31/04 | (2006.01) |

(Continued)

(52) U.S. Cl.
CPC ........ *B01F 15/0429* (2013.01); *B01F 5/0471* (2013.01); *B01F 15/0022* (2013.01); *B01F 15/00136* (2013.01); *B01F 15/00246* (2013.01); *B01F 15/00285* (2013.01); *B01F 15/0408* (2013.01); *F16K 7/045* (2013.01);
(Continued)

(58) Field of Classification Search
CPC ................ B01F 15/0429; B01F 15/026; B01F 15/00259; B01F 5/0471; B01F 15/00136; B01F 15/0022; B01F 15/00246; B01F 15/00285; B01F 15/0408; F16K 7/045; F16K 31/04; G01F 1/00
See application file for complete search history.

(56) References Cited

U.S. PATENT DOCUMENTS 4,322,054 A  *  3/1982  Campbell ............... F16K 7/061
                                                      251/5
2002/0034122 A1  3/2002  Lemke
(Continued)

FOREIGN PATENT DOCUMENTS

| | | | |
|---|---|---|---|
| JP | 2002-513178 A | 5/2002 | |
| JP | 2016-503345 A | 2/2016 | |

(Continued)

*Primary Examiner* — Anshu Bhatia
(74) *Attorney, Agent, or Firm* — Manabu Kanesaka

(57) ABSTRACT

A fluid mixing device includes a fluid mixing unit, a concentration measurement unit, a mixing ratio control unit controlling a mixing ratio of different fluid components in the fluid mixing unit based on a concentration of a mixed fluid measured by the concentration measurement unit, a flow rate measurement unit, and a flow rate control unit controlling a flow rate of the mixed fluid based on the flow rate of the mixed fluid measured by the flow rate measurement unit. The concentration measurement unit, the flow rate measurement unit, and the flow rate control unit are arranged on the downstream side of the fluid mixing unit. A flow passage of the concentration measurement unit, a flow passage of the flow rate measurement unit, and the elastic tube of the flow rate control unit are arranged to extend along a flow passage axis on a line with each other.

12 Claims, 6 Drawing Sheets

(51) Int. Cl.
*G01F 1/00* (2006.01)
*B01F 15/02* (2006.01)

(52) U.S. Cl.
CPC .............. *F16K 31/04* (2013.01); *G01F 1/00* (2013.01); *B01F 15/00259* (2013.01); *B01F 15/026* (2013.01)

(56) References Cited

U.S. PATENT DOCUMENTS

2007/0070803 A1* 3/2007 Urquhart ............ B01F 15/0429
366/152.4
2015/0298082 A1 10/2015 Machuca et al.

FOREIGN PATENT DOCUMENTS

WO 99/56189 A1 11/1999
WO 2014/078750 A1 5/2014

* cited by examiner

FLUID MIXING DEVICE

CROSS-REFERENCE TO RELATED APPLICATIONS

This application is based on Japanese Patent Application No. 2017-135210, the contents of which are incorporated herein by reference.

BACKGROUND OF THE INVENTION

1. Field of the Invention

The present invention relates to a fluid mixing device for supplying a fluid mixture of different fluid components to the outside at a predetermined concentration and a predetermined flow rate.

2. Description of Related Art

In various industries, such as a chemical factory, a semiconductor production field, a food field, and a biotechnology field, it is required to mix different fluid components at an accurate ratio. For example, in a semiconductor production process, it is necessary to control the concentration with high accuracy because the concentration of a cleaning solution obtained by diluting with pure water a chemical solution, such as hydrofluoric acid used in wet etching, or a CMP slurry fluid used in a chemical mechanical polishing (CMP) has a large influence on quality of a wafer.

When mixing different fluid components, for example, as described in Japanese Unexamined Patent Publication No. 2002-513178, it is general to supply a fluid mixture of different fluid components to the outside at a predetermined flow rate after adjusting the concentration of the fluid mixture to a predetermined concentration in a tank. In the system disclosed in Japanese Unexamined Patent Publication No. 2002-513178, a slurry fluid having a fixed content of slurry within a predetermined standard range is prepared, by measuring the conductivity of the slurry fluid mixed in a tank for feedback control and controlling the amount of diluent supplied into the tank, to be supplied to the outside. Further, for example, as disclosed in Japanese Unexamined Patent Publication No. 2016-503345, a method of performing so-called in-line mixing in which mixing is performed without using the tank by adding a different fluid component to a fluid being transported is also used. The system disclosed in Japanese Unexamined Patent Publication No. 2016-503345 includes one or a plurality of sensors for detecting one or a plurality of physical features of a mixture during the mixing process, and controls a concentration of the mixture by adjusting an opening size of a control valve provided in a conduit for supplying a first substance of the mixture into a mixing zone, based on the physical features measured by the sensor.

BRIEF SUMMARY OF THE INVENTION

In a configuration, such as a system disclosed in Japanese Unexamined Patent Publication No. 2002-513178, there is a problem that an equipment size is large and a flow passage structure also becomes complicated. On the other hand, in an in-line mixing without using a tank as in the system disclosed in Japanese Unexamined Patent Publication No. 2016-5033345, there is a problem that flow rate is not controllable. Furthermore, in a case of handling slurry fluid, when there is a curved portion on a transportation path after adjusting the concentration of the slurry fluid to a predetermined value, stagnation occurs at the curved portion, so that solid components are likely to be accumulated and a change in concentration of the slurry fluid is likely to occur. The change in concentration becomes a serious problem in the semiconductor field and the like in which the concentration of the slurry fluid is required to be controlled with high accuracy.

Accordingly, it is an object of the present invention to solve the problems in the prior art and to provide a fluid mixing device which can mix different fluid components to generate a fluid mixture having a predetermined concentration while controlling a flow rate and which can suppress a change in concentration in mixing process and flow rate control process.

In order to achieve the above object, according to the present invention, there is provided a fluid mixing device including: a fluid mixing unit mixing different fluid components to generate a mixed fluid; a concentration measurement unit measuring a concentration of the mixed fluid; a mixing ratio control unit controlling a mixing ratio of the different fluid components in the fluid mixing unit based on the concentration of the mixed fluid measured by the concentration measurement unit; a flow rate measurement unit measuring a flow rate of the mixed fluid; and a flow rate control unit controlling the flow rate of the mixed fluid based on the flow rate of the mixed fluid measured by the flow rate measurement unit, in which the concentration measurement unit, the flow rate measurement unit, and the flow rate control unit are arranged on the downstream side of the fluid mixing unit, so that the mixed fluid generated in the fluid mixing unit is supplied to an outside through the concentration measurement unit, the flow rate measurement unit, and the flow rate control unit, the flow rate control unit comprising a pinch valve having an elastic tube, the elastic tube being arranged to extend along a flow passage axis on a line with a flow passage of the concentration measurement unit and a flow passage of the flow rate measurement unit.

In the fluid mixing device, the concentration of the mixed fluid generated by the fluid mixing unit is measured by the concentration measurement unit provided on the downstream side of the fluid mixing unit, and the mixing ratio control unit controls the mixing ratio of the different fluid components mixed by the fluid mixing unit, based on the measured concentration of the mixed fluid. Therefore, it is possible to supply the mixed fluid having a desired concentration to the downstream side. Further, the flow rate of the mixed fluid is measured by the flow rate measurement unit provided on the downstream side of the fluid mixing unit and the flow rate control unit controls the flow rate of the mixed fluid based on the measured flow rate of the mixed fluid. Therefore, it is possible to supply the mixed fluid having a desired flow rate to the outside. Furthermore, since the flow rate control unit is constituted by the pinch valve having the elastic tube, stagnation of the fluid is unlikely to occur in the structure of the flow passage. In addition, the flow passage of the concentration measurement unit, the flow passage of the flow rate measurement unit, and the elastic tube of the flow rate control unit extend on a line with each other, and the mixed fluid generated by the fluid mixing unit does not pass through the curved portion until being discharged from the fluid mixing device after the next stage of the fluid mixing unit. Therefore, even in a case of handling the slurry fluid or the like, accumulation of solid components due to stagnation is unlikely to occur, so that it is possible to suppress the change in concentration and cleaning of the flow passage can become easy.

In the above fluid mixing device, it is preferable that the fluid mixing unit includes a main flow passage extending linearly and a branch flow passage joining the main flow passage and that the mixing ratio control unit controls a mixing ratio of a first fluid component supplied to the main flow passage and a second fluid component supplied to the branch flow passage by controlling the flow rate of the first fluid component or the flow rate of the second fluid component, the main flow passage being arranged to extend along the flow passage axis on a line with the flow passage of the concentration measurement unit, the flow passage of the flow rate measurement unit and the elastic tube of the flow rate control unit. In such a configuration, the mixed fluid does not pass through the curved portion after being mixed and discharged to the outside from the fluid mixing device, so that the accumulation due to the stagnation of the fluid is unlikely to occur and it is possible to suppress the change in concentration. Therefore, more accurate concentration control can become possible. Further, ease of cleaning can be further improved.

In one embodiment, the mixing ratio control unit includes a pinch valve having an elastic tube. The pinch valve has the structure of the flow passage in which the accumulation due to the stagnation of the fluid is unlikely to occur, and the controllability of the concentration in a case of handling the slurry fluid and the ease of cleaning of the fluid mixing device are further improved.

In this case, it is preferable that the elastic tube of the mixing ratio control unit is connected to an upstream side of the main flow passage of the fluid mixing unit, and that the elastic tube of the mixing ratio control unit and the main flow passage of the fluid mixing unit are arranged to extend along the flow passage axis on a line with each other. In such a configuration, since the curved portion does not exist in the flow passage of the fluid from the mixing ratio control unit, which controls the flow rate of the first fluid component for the mixing ratio control, to a merging portion of the second fluid component, the accumulation of the fluid is unlikely to occur. In particular, in a case where the first fluid component is a slurry component, the accumulation is unlikely to occur, the clogging due to the accumulation is unlikely to occur, and the slurry component having an accurate flow rate is likely to reach the merging portion. This makes the accurate concentration control possible.

The first fluid component may be a slurry component and the second fluid component may be at least one of a diluent and an additive.

In the fluid mixing device, it is preferable that the elastic tube of the flow rate control unit is connected to a downstream side of the flow passage of the flow rate measurement unit.

Preferably, the flow rate measurement unit is an ultrasonic flow meter measuring a flow rate by ultrasonic waves. In this case, more preferably, the flow rate measurement unit includes a measurement pipe configuring the flow passage of the flow rate measurement unit, and a pair of ultrasonic vibrators provided on an outer circumferential portion of the measurement pipe so as to be spaced apart from each other in a flow passage axis direction, the flow rate measurement unit determining a flow velocity of the mixed fluid by receiving an ultrasonic vibration transmitted from one of the pair of ultrasonic vibrators through the mixed fluid in the measurement pipe with the other of the pair of ultrasonic vibrators, alternately switching between the ultrasonic vibrator on the transmitting side and the ultrasonic vibrator on the receiving side, and measuring a flow velocity of the mixed fluid by measuring the ultrasonic wave propagation time between the pair of ultrasonic vibrators. A sensing element need not to be provided in the flow passage and does not interfere with the flow of the fluid. Therefore, particularly in a case where the mixed fluid is a slurry fluid, it is possible to make the accumulation unlikely to occur, and cleaning also can become easy.

According to the fluid mixing device of the present invention, the concentration and the flow rate of the mixed fluid can be controlled, and further, even in a case of handling the slurry fluid or the like, the change in concentration can be suppressed. Therefore, the present invention makes it possible to supply the mixed fluid having a concentration controlled with high accuracy to the outside at a predetermined flow rate. In addition, the cleaning of the flow passage also can become easy, and maintainability can be improved.

BRIEF DESCRIPTION OF THE DRAWINGS

The above and other objects, features and advantages of the present invention will be described below in more detail based on an embodiment thereof with reference to the accompanying drawings, in which.

DESCRIPTION OF THE PREFERRED EMBODIMENT

Figure 1:
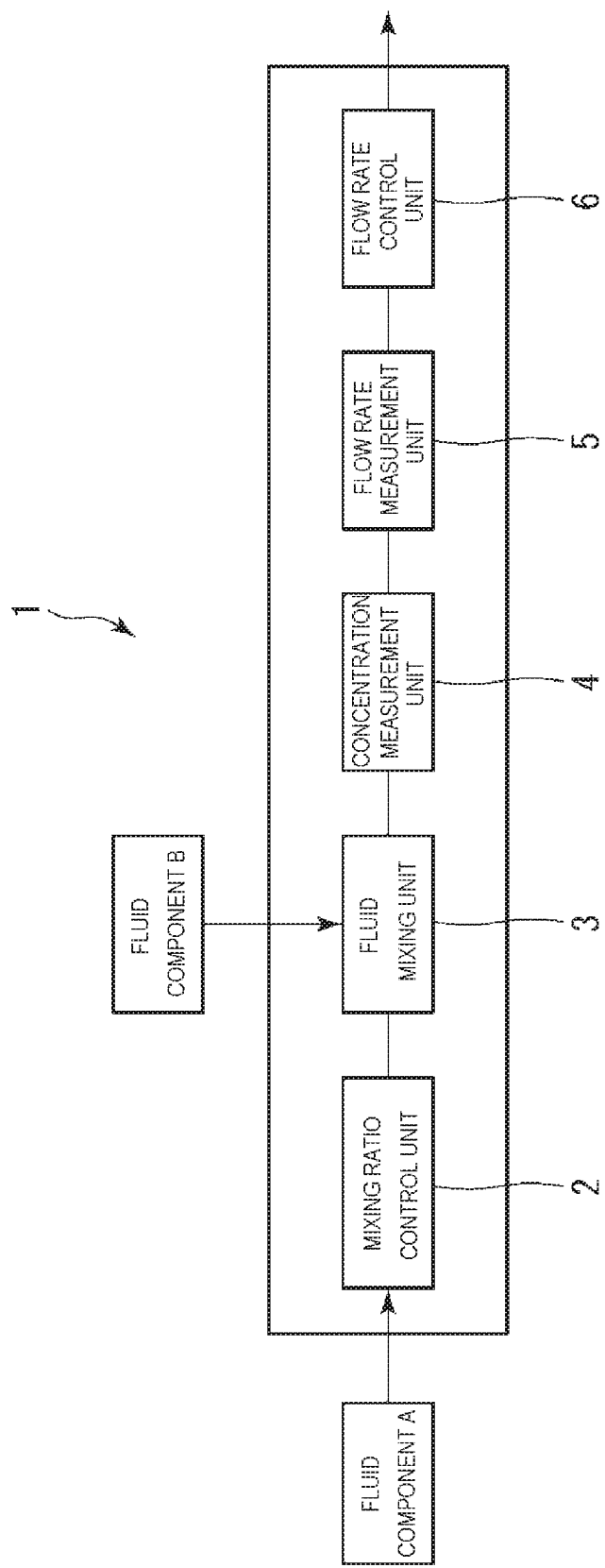
FIG. 1 is a block diagram showing the overall configuration of a fluid mixing device according to the present invention.

An embodiment of a fluid mixing device according to the present invention will be described below with reference to the drawings.

First, a basic configuration of the fluid mixing device according to the present invention will be described with reference to FIG.1.

The fluid mixing device 1 includes a mixing ratio control unit 2, a fluid mixing unit 3, a concentration measurement unit 4 provided on the downstream side of the fluid mixing unit 3, a flow rate measurement unit 5, and a flow rate control unit 6. The flow rate control unit 6 is constituted by a pinch valve having an elastic tube and a pinching element which presses the elastic tube to change an opening degree of the elastic tube. Ii is noted that the way of changing the opening degree of the pinch valve is not limited to pressing, and other ways, such as twisting, may be used. Different fluid components, i.e., fluid component A and fluid component B, are supplied to the fluid mixing unit 3, the two fluid components are mixed with each other in a piping to generate a mixed fluid. The mixed fluid generated in the fluid mixing unit 3 is supplied to the outside through the concentration measurement unit 4, the flow rate measurement unit 5, and the flow rate control unit 6. The concentration of the predetermined component of the mixed fluid flowing out of the fluid mixing unit 3 is measured by the concentration measurement unit 4, and the mixing ratio control unit 2 controls the mixing ratio of the fluid component A and the fluid component B based on the measured concentration of the mixed fluid to adjust the concentration of the mixed fluid to a predetermined value. The mixing ratio control unit 2 adjusts the mixing ratio of the fluid component A to the fluid component B in the fluid mixing unit 3 to control the concentration of the mixed fluid to the predetermined value, for example, by changing the flow rate of the fluid component A such that a difference between the concentration of the mixed fluid measured by the concentration measurement unit 4 and the predetermined concentration becomes zero. The flow rate of the mixed fluid is measured by the flow rate measurement unit 5, and the flow rate control unit 6 adjusts the flow rate of the mixed fluid to a predetermined value based on the measured flow rate of the mixed fluid. For example, the flow rate control unit 6 controls the flow rate of the mixed fluid supplied to the outside through the flow rate control unit 6 to the predetermined value such that the difference between the flow rate of the mixed fluid measured by the flow rate measurement unit 5 and the predetermined flow rate becomes zero. In this way, the fluid mixing device 1 can mix different fluid components A and B with each other to generate the mixed fluid having the predetermined concentration and supply the mixed fluid to the outside at the predetermined flow rate.

In FIG. 1, the fluid mixing unit 3, the concentration measurement unit 4, the flow rate measurement unit 5, and the flow rate control unit 6 are arranged in this order and connected to each other. However, the order of the arrangement of the concentration measurement unit 4, the flow rate measurement unit 5, and the flow rate control unit 6 is not limited to the order shown in FIG. 1, and the positions may be exchanged to each other. Further, the method of controlling the mixing ratio of the fluid component A and the fluid component B in the fluid mixing unit 3 is not limited to the above-described method as long as it is possible to change the mixing ratio of the fluid component A to the fluid component B, and for example, in addition to the mixing ratio control unit 2 which controls the flow rate of the fluid component A, another mixing ratio control unit which controls the flow rate of the fluid component B may be provided.

In a case where the mixed fluid is generated by mixing a solid component and a liquid component with each other similar to a slurry fluid, if the piping for transporting the mixed fluid has a curved portion or a bent portion (hereinafter, described as a "curved portion" including a bent portion), the stagnation is likely to occur, so that the solid component adheres to the piping and the concentration is likely to change. Therefore, particularly, if the curved portion exists between the downstream side of the fluid mixing unit 3 and a mixed fluid discharge port of the fluid mixing device 1 (an outlet which discharge the mixed fluid from the fluid mixing device 1 to the outside), even when the fluid component A and the fluid component B are mixed with each other in the fluid mixing unit 3 so as to achieve the predetermined concentration, there is a possibility that the concentration of the mixed fluid supplied to the outside changes from the predetermined value. In the fluid mixing device 1, in order to prevent such a change, the flow passage of the concentration measurement unit 4 positioned on the downstream side of the fluid mixing unit 3, the flow passage of the flow rate measurement unit 5, and the elastic tube of the flow rate control unit 6 are formed to extend along the flow passage axis on a line with each other, so that the curved portion is not formed between the next stage (the concentration measurement unit 4 in FIG. 1) of the fluid mixing unit 3 and the mixed fluid discharge port of the fluid mixing device 1. Accordingly, even in a case where the mixed fluid is a slurry fluid, occurrence of the stagnation of the mixed fluid between the fluid mixing unit 3 which mixes the fluid component A and the fluid component B with each other and the mixed fluid discharge port of the fluid mixing device 1 can be suppressed and adhesion of the solid component (slurry component) is unlikely to occur, so that the change in concentration of the mixed fluid can be suppressed, thereby making it possible to supply the mixed fluid having a desired flow rate to the outside at more accurate concentration. In addition, in the configuration, cleaning of the piping also can become easier.

Further, when the adhesion of the solid component occurs between a merging portion of the fluid component A and the fluid component B and the concentration measurement unit 4, the concentration of the mixed fluid at the merging portion cannot be accurately measured in the concentration measurement unit 4, and the control of the concentration of the mixed fluid can be negatively affected. Therefore, it is preferable that the flow passage in which the mixed fluid generated in the fluid mixing unit 3 by mixing the fluid component A and the fluid component B with each other flows is also formed so as to extend along the flow passage axis on a line with the flow passage of the concentration measurement unit 4, the flow passage of the flow rate measurement unit 5, and the elastic tube of the flow rate control unit 6 so that the curved portion is not formed in the flow passage in which the mixed fluid flows until reaching the mixed fluid discharge port of the fluid mixing device 1 after the fluid component A and the fluid component B are mixed with each other. This feature can further suppress the change in concentration of the mixed fluid to further improve the accuracy of the concentration control. In addition, cleaning of the piping also can become easier.

Next, with reference to FIGS. 2 to 6, an embodiment of the fluid mixing device 10 according to the present invention will be described below.

The fluid mixing device 10 includes a first electric control valve 11 serving as a mixing ratio control unit, a fluid mixing unit 12, a concentration measurement unit 13, a flow rate measurement unit 14, and a second electric control valve 15 serving as a flow rate control unit, and these units are provided in a housing 16. The second electric control valve 15 is a pinch valve.

The fluid mixing unit 12 is arranged on the downstream side of the first electric control valve 11, and includes a main flow passage 12a extending linearly in a direction of a flow passage axis F and connected to the downstream side of the first electric control valve 11, and a branch flow passage 12b connected to the main flow passage 12a in an intermediate portion of the main flow passage 12a in the direction of the flow passage axis F. The first fluid component that flows in from a first fluid inflow part 17 is supplied to the main flow passage 12a through the first electric control valve 11 and the second fluid component is supplied to the branch flow passage 12b from a second fluid inflow part (not shown). The second fluid component is merged through the branch flow passage 12b with the first fluid component flowing in the main flow passage 12a, thereby mixing the second fluid component with the first fluid component to generate the mixed fluid. In the present embodiment, the main flow passage 12a and the branch flow passage 12b are formed in a piping block, which is formed of tetrafluoroethylene-perfluoroalkyl vinyl ether copolymer (PFA) and is fixed to a base portion 47a of a first casing 47 described later.

The concentration measurement unit 13 is arranged on the downstream side of the fluid mixing unit 12 and includes a concentration measurement flow passage 13a extending linearly along the flow passage axis F and connected to be adjacent to the downstream side of the main flow passage 12a of the fluid mixing unit 12, a concentration sensor 13b provided around the concentration measurement flow passage 13a, and a concentration measurement control circuit 13c. An indicator of the concentration of the mixed fluid flowing in the concentration measurement flow passage 13a is measured by the concentration sensor 13b and is transmitted to the concentration measurement control circuit 13c. In the present embodiment, the concentration sensor 13b employs a method of determining the concentration of the mixed fluid by measuring the conductivity of the mixed fluid flowing in the concentration measurement flow passage 13a as a concentration indicator. A method of determining the concentration of the mixed fluid by conductivity thereof is known as disclosed, for example, in Japanese Unexamined Patent Publication No. 2002-513178, and thus, the detailed description thereof will not be omitted here. The concentration measurement control circuit 13c adjusts the mixing ratio of the first fluid component and the second fluid component and controls the concentration of the mixed fluid, by controlling the valve opening degree of the first electric control valve 11, based on the concentration of the mixed fluid measured by the concentration sensor 13b, to change the flow rate of the first fluid component supplied to the main flow passage 12a. The flow rate measurement unit 14 is arranged on the downstream side of the concentration measurement unit 13 and includes a flow rate measurement flow passage 14a extending linearly along the flow passage axis F and connected to be adjacent to the downstream side of the concentration measurement flow passage 13a, a flow rate sensor 14b provided around the flow rate measurement flow passage 14a, and a flow rate measurement control circuit 14c. An indicator of the flow rate of the mixed fluid flowing in the flow rate measurement flow passage 14a is measured by the flow rate sensor 14b and is transmitted to the flow rate measurement control circuit 14c. The flow rate measurement control circuit 14c controls the valve opening degree of the second electric control valve 15, based on the flow rate determined from the indicator of the flow rate of the mixed fluid measured by the flow rate sensor 14b, to control the flow rate of the mixed fluid flowing out to the outside through the mixed fluid outflow part 18 from the fluid mixing device 10.

In the fluid mixing device 10, the main flow passage 12a of the fluid mixing unit 12, the concentration measurement flow passage 13a of the concentration measurement unit 13, and the flow rate measurement flow passage 14a of the flow rate measurement unit 14 extend along the flow passage axis F on a line with each other, and no curved portion exists from a junction of the main flow passage 12a and the branch flow passage 12b in the fluid mixing unit 12 to the second electric control valve 15 serving as the flow rate control unit. Therefore, even in a case where the mixed fluid is a slurry fluid, the adhesion of the solid component due to the stagnation of the mixed fluid can be suppressed, so that the change in concentration between the junction of the main flow passage 12a and the branch flow passage 12b in the fluid mixing unit 12 and the second electric control valve 15 is unlikely to occur, thereby making it possible to discharge the mixed fluid with accurate concentration to the outside. In addition, cleaning of the flow passage can become easier.

Detailed structures of the first electric control valve 11, the second electric control valve 15, and the flow rate sensor 14b will be described below.

Figure 2:
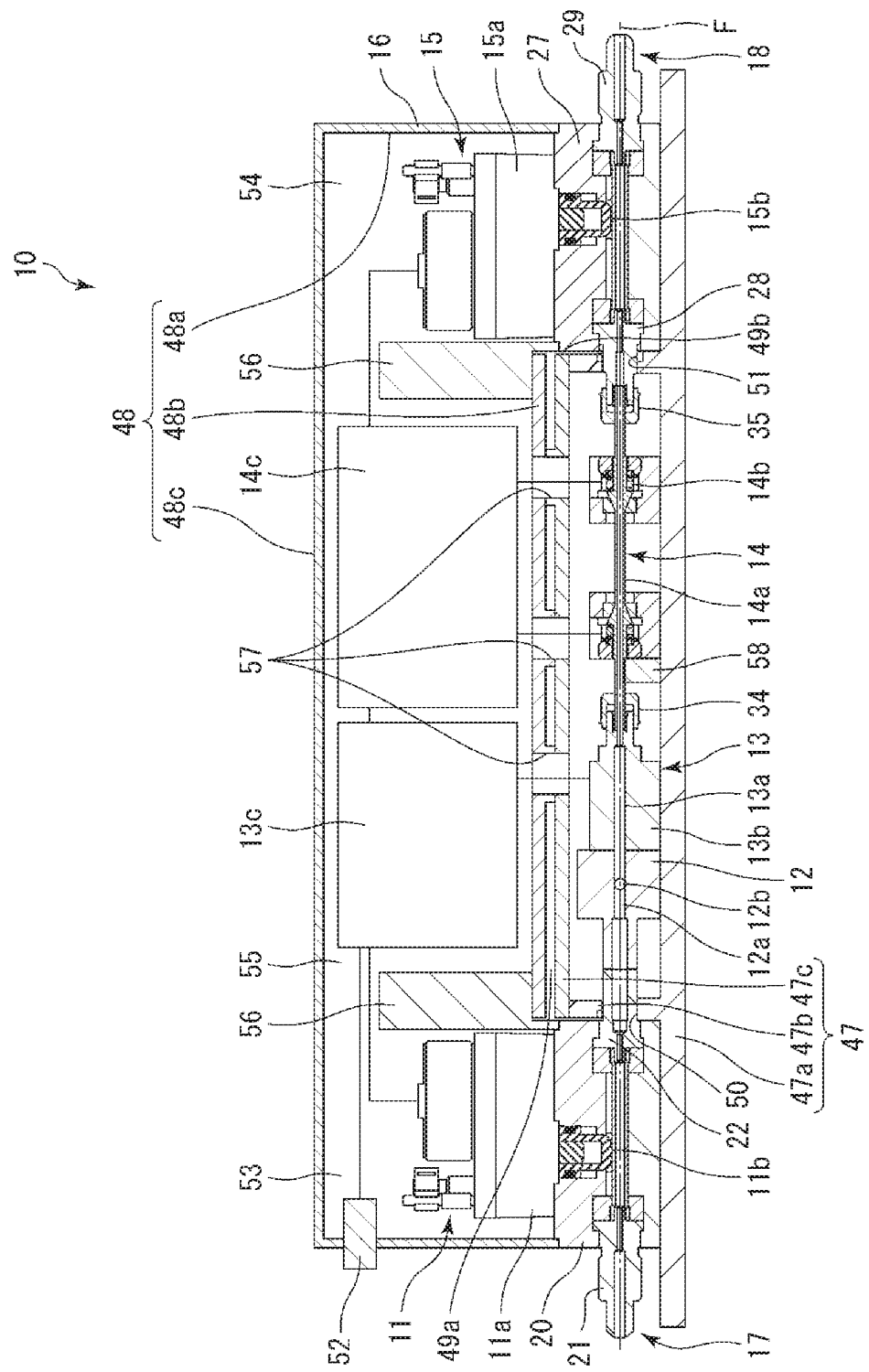
FIG. 2 is a longitudinal sectional view showing one embodiment of the fluid mixing device of the present invention.

As shown in FIG. 2, the first electric control valve 11 includes a first electric driving unit 11a and a first opening degree control unit 11b, and the first electric driving unit 11a and the first opening degree control unit 11b of the first electric control valve 11 are connected to each other by bolts and nuts (not shown). The first opening degree control unit 11b is configured to change the flow rate of the fluid by using the first electric driving unit 11a to change the valve opening degree. In the present embodiment, the pinch valve is used as the first electric control valve 11.

Figure 3:
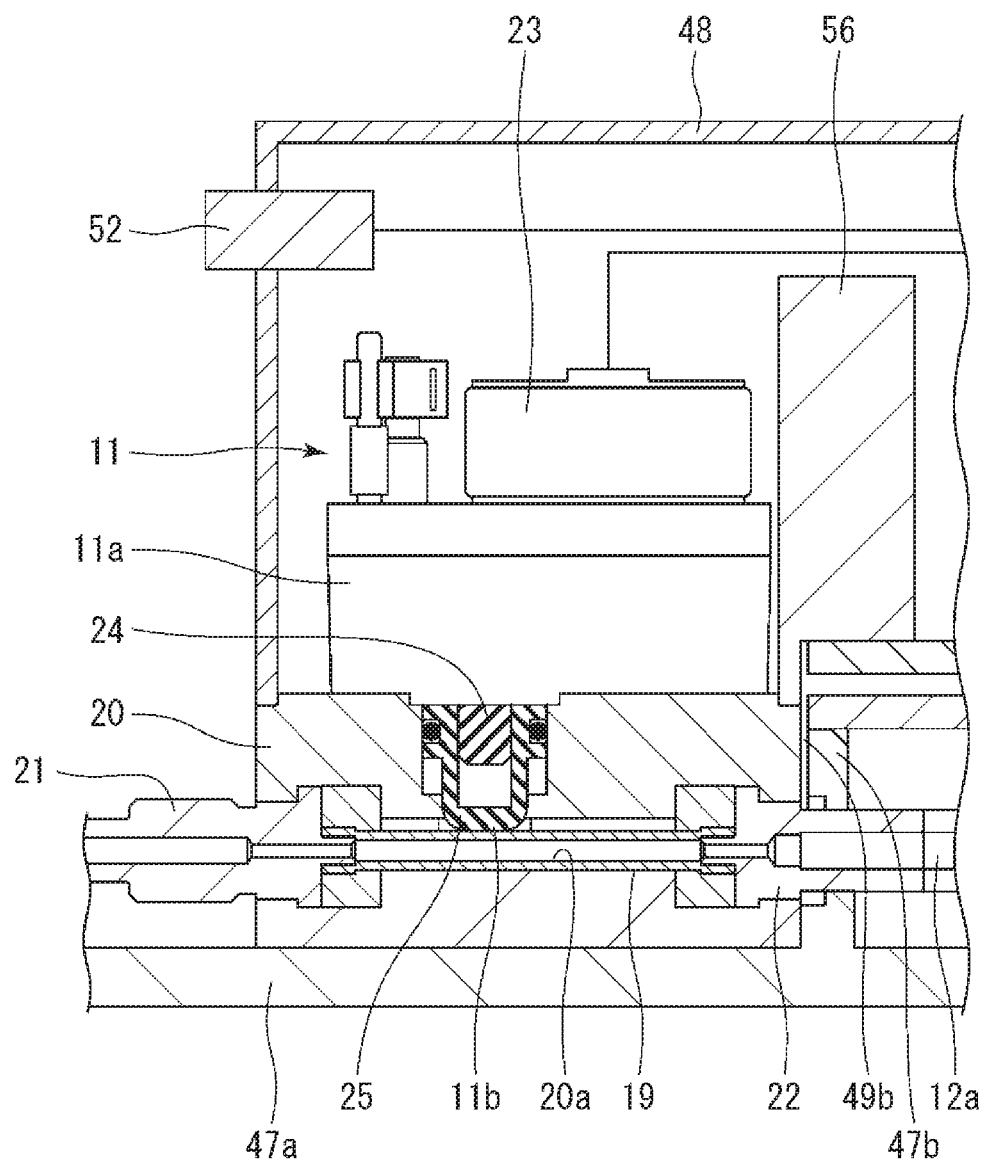
FIG. 3 is an enlarged view showing a first electric control valve of the fluid mixing device shown in FIG. 2.

As shown in detail in FIG. 3, the first opening degree control unit 11b includes an elastic tube 19, a valve body portion 20 configured by assembling two components together, a coupling element 21, and a coupling element 22. The elastic tube 19 is formed of a composite of fluororubber and silicon rubber. The valve body portion 20 is formed of polyvinyl chloride (PVC), and the coupling element 21 and the coupling element 22 are formed of PFA. The elastic tube 19 is housed in a tube receiving hole 20a formed linearly along the flow passage axis F so as to extend through the valve body portion 20 and constitutes a flow passage. The coupling element 21 and the coupling element 22 are connected to both end portions of the elastic tube 19, respectively. The coupling element 21 of the first electric control valve 11 is a piping which connects the elastic tube 19 and the external piping to each other and functions as the above-described first fluid inflow part 17. The coupling element 22 of the first electric control valve 11 is a piping which connects the elastic tube 19 and the main flow passage 12a of the fluid mixing unit 12 to each other. Preferably, the flow passage in the coupling element 21, the elastic tube 19, and the flow passage in the coupling element 22 are arranged so as to extend along the flow passage axis F on a line with each other. This feature can make the solid component unlikely to adhere even when the slurry fluid is used as a fluid, and also can make cleaning of the flow passage easier.

The first electric driving unit 11a includes a motor unit 23, a stem 24, and a pinching element 25. For example, a stepping motor can be used as the motor unit 23. The stem 24 provided below the motor unit 23 is coupled to a shaft of the motor unit 23 via a gear (not shown), so that the stem 24 moves up and down as the shaft of the motor unit 23 rotates. The pinching element 25 is connected to the lower end portion of the stem 24. The pinching element 25 is provided in an opening which extends from the upper portion of the valve body portion 20 to the tube receiving hole 20a, so that the pinching element 25 can press the elastic tube 19 by driving the motor unit 23 to move the stem 24 up and down, and change the opening area, thereby adjusting the flow rate of the fluid in the elastic tube 19. In the present embodiment, a method of changing the opening area by using the pinching element 25 to press the elastic tube 19 is employed. However, the method of changing the opening area of the elastic tube 19 is not particularly limited, and for example, it is also possible to employ another method, such as a method of changing the opening area of the elastic tube 19 by twisting the elastic tube 19.

The second electric control valve 15 has a similar configuration as that of the first electric control valve 11. The second electric control valve 15 includes a second electric driving unit 15a and a second opening degree control unit 15b, and the second electric driving unit 15a and the second opening degree control unit 15b of the second electric control valve 15 are connected to each other by bolts and nuts (not shown). The second opening degree control unit 15b is configured to change the flow rate of the fluid by using the second electric driving unit 15a to change the valve opening degree. The pinch valve is used as the second electric control valve 15. The differences between the pinch valve of the first electric control valve 11 and the pinch valve of the second electric control valve 15 will be mainly described below, and description of common points will be omitted.

Figure 4:
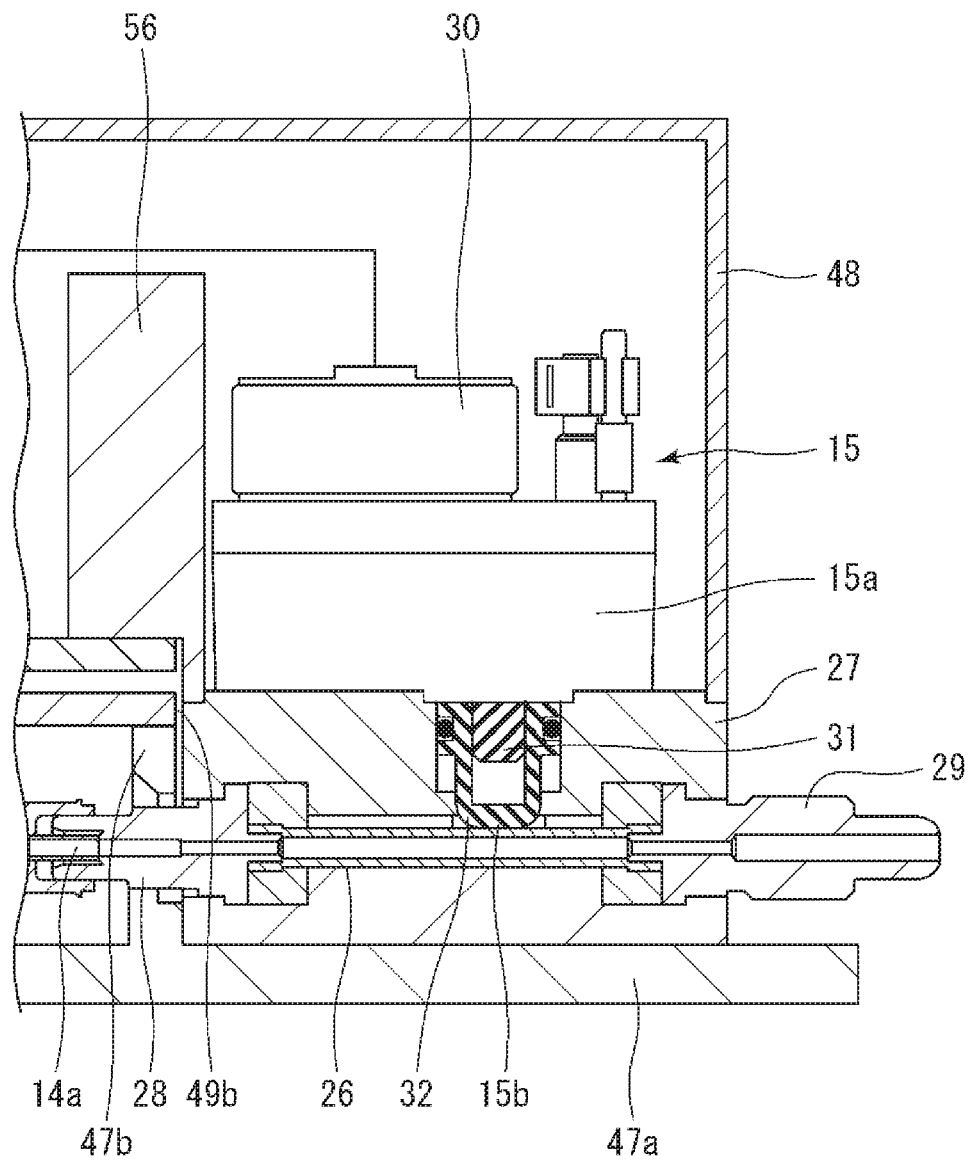
FIG. 4 is an enlarged view showing a second electric control valve of the fluid mixing device shown in FIG. 2.

As shown in detail in FIG. 4, similar to the first opening degree control unit 11b, the second opening degree control unit 15b includes an elastic tube 26, a valve body portion 27 configured by assembling the two components together, a coupling element 28, and a coupling element 29. The elastic tube 26, the valve body portion 27, and the coupling elements 28, 29 of the second opening degree control unit 15b have a similar configuration to that of the elastic tube 19, the valve body portion 20, and the coupling elements 21, 22 of the first opening degree control unit 11b. The coupling element 28 and the coupling element 29 are also connected to both end portions of the elastic tube 26 of the second electric control valve 15. However, the second electric control valve 15 is different from the first electric control valve 11 in that the coupling element 28 of the second electric control valve 15 is a piping which connects the flow rate measurement flow passage 14a of the flow rate measurement unit 14 and the elastic tube 26 to each other and in that the coupling element 29 of the second electric control valve 15 is a piping which connects the elastic tube 26 and the external piping to each other, and functions as a mixed fluid outflow part 18. Preferably, the flow passage in the coupling element 28, the elastic tube 26, and the flow passage in the coupling element 29 are arranged so as to extend along the flow passage axis F on a line with each other. This feature can make the solid component unlikely to adhere even when the slurry fluid is used as a fluid, and also can make cleaning of the flow passage easier. Other points of the second opening degree control unit 15b are the same as those of the first opening degree control unit 11b, and thus, the description thereof will be omitted here.

Similar to the first electric driving unit 11a, the second electric driving unit 15a includes a motor unit 30, a stem 31, and a pinching element 32, so that the pinching element 32 can press the elastic tube 26 by driving the motor unit 30 to move the stem 31 up and down and change the opening area, thereby adjusting the flow rate of the fluid in elastic tube 26. For example, a stepping motor can be used as the motor unit 30. Since the configuration and operation of the second electric driving unit 15a are exactly the same as those of the first electric driving unit 11a, the detailed description thereof will be omitted here. Further, similar to the first electric driving unit 11a, the second electric driving unit 15a also employs a method of changing the opening area by using the pinching element 32 to press the elastic tube 26. However, the method of changing the opening area of the elastic tube 26 is not particularly limited, and for example, it is also possible to employ another method, such as a method of changing the opening area of the elastic tube 26 by twisting the elastic tube 26.

Figure 5:
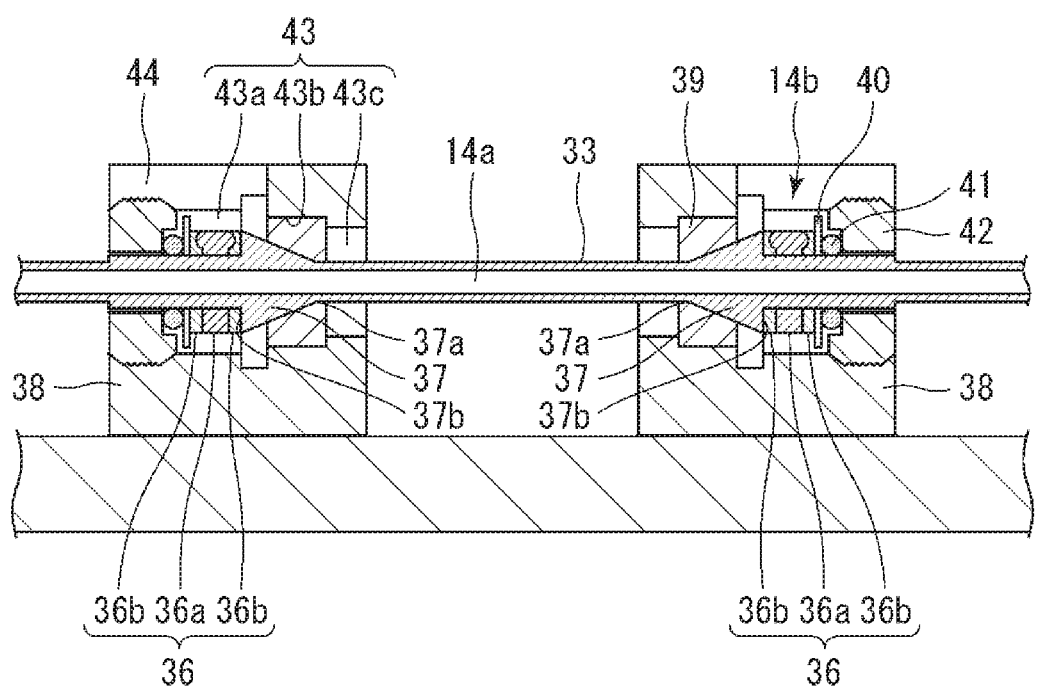
FIG. 5 is an enlarged view showing a flow rate measurement unit of the fluid mixing device shown in FIG. 2.

As shown in detail in FIG. 5, the flow rate measurement flow passage 14a of the flow rate measurement unit 14 is constituted by a measurement pipe 33 which extends linearly along the flow passage axis F, and the measurement pipe 33 is formed of PFA. As shown in FIG. 2, a connection member 34 which connects the measurement pipe 33 to a downstream end of the concentration measurement flow passage 13a of the concentration measurement unit 13 is provided at the end on the upstream side of the measurement pipe 33, and a connection member 35 which connects the measurement pipe 33 to the coupling element 28 of the second electric control valve 15 is provided at the end on the downstream side of the measurement pipe 33.

Figure 6:
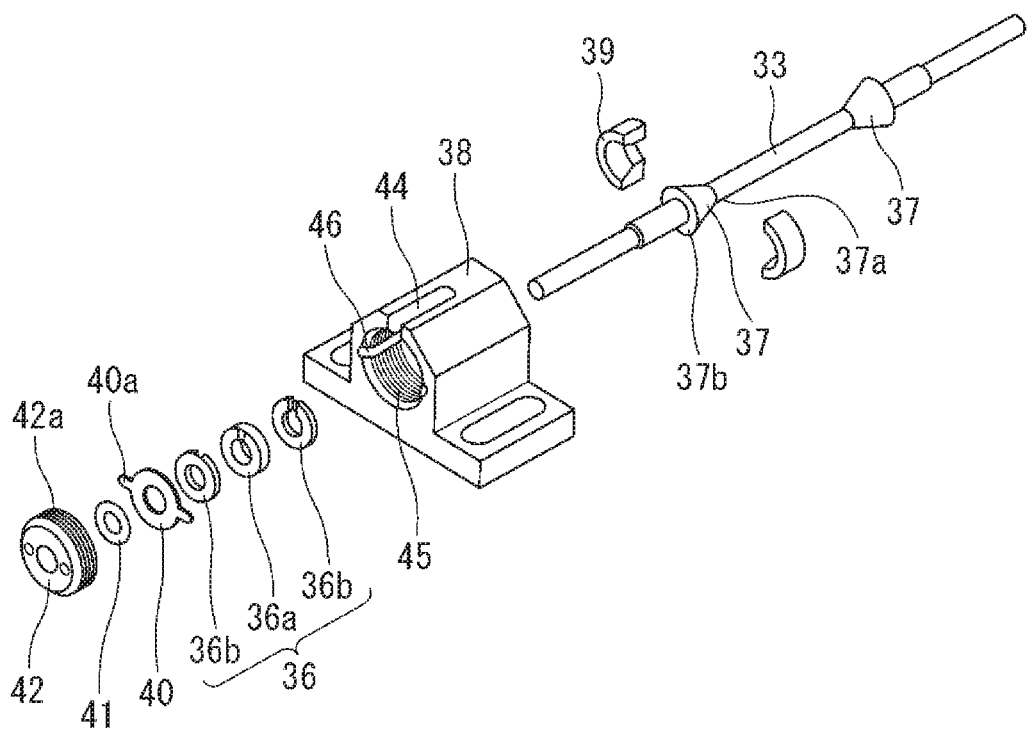
FIG. 6 is an exploded perspective view showing main portions of the flow rate measurement unit of the fluid mixing device shown in FIG. 2.

In the present embodiment, the flow rate sensor 14b is constituted by an ultrasonic flow meter, and includes a pair of ultrasonic vibrators 36, 36 and a pair of transmitting bodies 37, 37, as shown in FIGS. 5 and 6.

Each of the transmitting bodies 37 has a substantially conical shape, and the pair of transmitting bodies 37, 37 is spaced apart from each other in an axial direction of the measurement pipe 33 extending in parallel to the flow passage axis F so as to surround the measurement pipe 33. Further, each of the transmitting bodies 37 has an apex 37a and an axial direction end surface 37b which is positioned at the end opposite to the apex 37a in the axial direction of the measurement pipe 33 and which extends in a direction perpendicular to the axial direction of the measurement pipe 33, and the pair of transmitting bodies 37, 37 is arranged such that the axial direction end surfaces 37b of the transmitting bodies 37, 37 face farther from each other. The ultrasonic vibrator 36 is mounted on the axial direction end surface 37b of the transmitting body 37. In the present embodiment, the transmitting bodies 37, 37 are integrally formed with the measurement pipe 33.

As shown in FIG. 6, the ultrasonic vibrator 36 is constituted by an ultrasonic transducer 36a and two acoustic matching members 36b, 36b are provided so as to sandwich the ultrasonic transducer 36a. The ultrasonic vibrator 36 is covered with a fluororesin. The ultrasonic transducer 36a is formed of a piezoelectric material, such as lead zirconate titanate, and has a donut shape, that is, a perforated disk shape. The inner diameter of the ultrasonic transducer 36a is greater than the outer diameter of the measurement pipe 33, and the ultrasonic transducer 36a is arranged such that the inner circumferential surface of the ultrasonic transducer 36a is separated from the outer circumferential surface of the measurement pipe 33 when the ultrasonic vibrator 36 is mounted on the axial direction end surface 37b of the transmitting body 37. Each of the acoustic matching members 36b is formed of a glass epoxy resin, is formed with a cutout portion for receiving a wiring part of the ultrasonic transducer 36a, and has a donut shape, that is, a perforated disc shape of an outer diameter substantially the same as the outer diameter of the ultrasonic transducer 36a. The inner diameter of each of the acoustic matching members 36b is greater than the outer diameter of the measurement pipe 33, and the acoustic matching members 36b, 36b are arranged such that the inner circumferential surface of each of the acoustic matching members 36b, 36b is separated from the outer circumferential surface of the measurement pipe 33 when the ultrasonic vibrator 36 is mounted on the axial direction end surface 37b of the transmitting body 37. Further, one of the two acoustic matching members 36b, 36b is arranged between the axial direction end surface 37b of the transmitting body 37 and the ultrasonic transducer 36a, and the other acoustic matching member 36b is arranged so as to sandwich the ultrasonic transducer 36a between one acoustic matching member 36b and the other acoustic matching member 36b.

The wiring extending from the ultrasonic vibrator 36 is connected to the flow rate measurement control circuit 14c, and the flow rate measurement control circuit 14c adjusts the valve opening degree of the second electric control valve 15 to control the flow rate, based on the flow rate determined from the flow rate indicator of the mixed fluid measured by the ultrasonic vibrator 36.

The measurement pipe 33 and the flow rate sensor 14b thus configured are supported by two support units fixed to the base portion 47a of a first casing 47 which will be described later. Each of the support units includes a supporting member 38, a stopper 39, a pressing plate 40, a cushion 41, and a pressing member 42. The supporting member 38 is formed of PVC and has a prismatic shape extending in parallel to the flow passage axis F. As shown in FIG. 5, the supporting member 38 is formed with a through-hole 43 which extends coaxially with the center axis of the measurement pipe 33. The supporting member 38 has a slit 44 formed on the upper surface thereof to be in communication with the through-hole 43, so that the wiring extending from the ultrasonic transducer 36a of the flow rate sensor 14b can extend through the slit 44. The through-hole 43 includes a vibrator receiving portion 43a, a stopper receiving portion 43b, and an opening portion 43c. The opening portion 43c is formed on one end surface of the supporting member 38, and the diameter of the opening portion 43c is determined to be greater than the outer diameter of the transmitting body 37. The stopper receiving portion 43b is formed between the opening portion 43c and the vibrator receiving portion 43a, and the diameter of the stopper receiving portion 43b is determined to be greater than the diameter of the opening portion 43c. The vibrator receiving portion 43a is formed on the other end surface of the supporting member 38, and the diameter of the vibrator receiving portion 43a is determined to be greater than the diameter of the stopper receiving portion 43b and to have a size sufficient to house the ultrasonic vibrator 36 on the inside thereof. As shown in FIG. 6, a female thread portion 45 is formed in an end portion of the vibrator receiving portion 43a, and an engaging groove 46 is formed on the inner circumferential surface along the radial direction.

The stopper 39 is formed of PVC, has a substantially cylindrical shape, and is divided into two parts in the circumferential direction. The stopper 39 is arranged in the stopper receiving portion 43b of the supporting member 38. The outer diameter of the stopper 39 is substantially the same as the inner diameter of the stopper receiving portion 43b and the inner diameter of the stopper 39 is determined to be greater than the outer diameter of the measurement pipe 33.

The pressing plate 40 is formed of stainless steel and has a donut shape, that is, a perforated disk shape having an engaging projection 40a that extends in the radial direction. The engaging projection 40a of the pressing plate 40 is engaged with the engaging groove 46 of the supporting member 38. The pressing plate 40 is arranged so as to abut against the acoustic matching member 36b of the ultrasonic vibrator 36. The cushion 41 is an O-ring, which is formed of ethylene propylene rubber (EPDM) and has an inner diameter greater than the outer diameter of the measurement pipe 33.

The pressing member 42 is formed of PVC, and has a substantially cylindrical shape. The outer diameter of the pressing member 42 is approximately the same as the inner diameter of the vibrator receiving unit 43a of the supporting member 38, and the inner diameter of the pressing member 42 is greater than the outer diameter of the measurement pipe 33. The pressing member 42 is formed on the outer circumferential surface thereof with a male thread portion 42a threadedly engaging with the female thread portion 45 of the supporting member 38. Further, as shown in FIG. 5, the pressing member 42 is formed on one end surface thereof with a recess portion for housing the cushion 41.

A method of assembling the flow rate sensor 14b and the measurement pipe 33 of the fluid mixing device 10 according to the present embodiment will be described below. The measurement pipe 33 and the transmitting body 37 integrally formed with the measurement pipe 33 are inserted into the through-hole 43 of the supporting member 38. After this, the stopper 39 is mounted on the stopper receiving portion 43b, so that the stopper 39 is sandwiched between the supporting member 38 and the transmitting body 37. One acoustic matching member 36b, the ultrasonic transducer 36a, and the other acoustic matching member 36b of the ultrasonic vibrator 36 are arranged in this order on the axial direction end surface 37b of the transmitting body 37. While the engaging projection 40a of the pressing plate 40 is engaged with the engaging groove 46 of the supporting member 38, the pressing plate 40 is inserted into the vibrator receiving portion 43a so that the pressing plate 40 abuts against the acoustic matching member 36b. Next, the pressing member 42 with the cushion 41 mounted thereon is threadedly engaged with the supporting member 38. The pressing member 42 presses the ultrasonic vibrator 36 against the transmitting body 37 via the pressing plate 40, thereby tightly adhering and fixing the ultrasonic vibrator 36 to the transmitting body 37. At this time, since the pressing plate 40 does not rotate even when the pressing member 42 rotates, the ultrasonic vibrator 36 is pressed against the transmitting body 37 without rotating. After the pair of ultrasonic vibrators 36, 36 is threadedly engaged with to the pair of transmitting bodies 37, 37, the connection members 34, 35 are mounted on both ends of the measurement pipe 33. Next, by fixing the supporting member 38 to the base portion 47a of a first casing 47 which will be described later by means of bolts and nuts (not shown), the flow rate sensor 14b and the measurement pipe 33 are fixed to the first casing 47. After that, the measurement pipe 33 and the concentration measurement flow passage 13a of the concentration measurement unit 13 on the upstream side of the measurement pipe 33 are connected to each other via the connection member 34, and the measurement pipe 33 and the elastic tube 26 of the second electric control valve 15 on the downstream side of the measurement pipe 33 are connected to each other via the connection member 35 and the coupling element 28. At this time, the elastic tube 19 of the first electric control valve 15, the main flow passage 12a of the fluid mixing unit 12, the concentration measurement flow passage 13a of the concentration measurement unit 13, the measurement pipe 33 (flow rate measurement flow passage 14a) of the flow rate measurement unit 14, and the elastic tube 26 of the second electric control valve 15 are arranged along the same flow passage axis F on a line with each other.

Next, the structure of the housing 16 of the fluid mixing device 10 will be described. The housing 16 is constructed by assembling the first casing 47 and the second casing 48 together. The fluid mixing unit 12, the concentration sensor 13b, and the flow rate sensor 14b are arranged in the first casing 47, and the first electric control valve 11, the second electric control valve 15, the concentration measurement control circuit 13c, and the flow rate measurement control circuit 14c are arranged in the second casing 48. Further, spatial layers 49a, 49b are provided between the first casing 47 and the second casing 48.

The first casing 47 is formed of glass fiber reinforced polypropylene (PPG) and includes the base portion 47a, a circumferential casing body portion 47b extending in a rectangular shape, and a lid portion 47c. In the present embodiment, the base portion 47a is provided so as to close the bottom opening of the casing body portion 47b, and the base portion 47a and the casing body portion 47b are integrally formed. However, the base portion 47a and the casing body portion 47b may be separately formed and joined by means of bolts or the like. The upper opening of the casing body portion 47b is closed by joining the lid portion 47c to the upper portion of the casing body portion 47b by means of bolts and nuts (not shown). A space for the first electric control valve 11 and the second electric control valve 15 to be arranged therein is formed on the base portion 47a and on the outer side of both end portions in the direction of the flow passage axis F in an region on the base portion 47a surrounded by the casing body portion 47b, so that the spatial layers 49b, 49b can be formed between the first electric control valve 11 and the casing body portion 47b of the first casing 47 and between the second electric control valve 15 and the casing body portion 47b of the first casing 47.

The casing body portion 47b of the first casing 47 are formed on both end walls thereof in the direction of the flow passage axis F with a first connection pipe member receiving port 50 and a second connection pipe member receiving port 51, respectively. The first connection pipe member receiving port 50 supports the coupling element 22 of the first electric control valve 11, which is a piping that connects the fluid mixing unit 12 and the first electric control valve 11 to each other, by arranging the coupling element 22 so as to extend through the first connection pipe member receiving port 50, and the second connection pipe member receiving port 51 supports the coupling element 28 of the second electric control valve 15, which is a piping that connects the flow rate measurement unit 14 and the second electric control valve 15 to each other, by arranging the coupling element 28 so as to extend through the second connection pipe member receiving port 51. A center axis of the first connection pipe member receiving port 50 and a center axis of the second connection pipe member receiving port 51 exist on the same axis, so that the coupling element 22 of the first electric control valve supported by the first connection pipe member receiving port 50, the main flow passage 12a of the fluid mixing unit 12, the concentration measurement flow passage 13a of the concentration measurement unit 13, the flow rate measurement flow passage 14a of the flow rate measurement unit 14, and the coupling element 28 of the second electric control valve supported by the second connection pipe member receiving port 51 are arranged along the flow passage axis F on a line with each other.

Similar to the first casing 47, the second casing 48 is formed of PPG, and includes a circumferential casing body portion 48a extending in rectangular shape, a bottom portion 48b, a lid portion 48c, as shown in FIG. 2. The second casing 48 is provided, on the end wall on the upstream side in the direction of the flow passage axis F of the casing body portion 48a thereof, with a connector 52, such as an electric wiring for supplying electricity to the fluid mixing device 10. In the present embodiment, as shown in detail in FIGS. 3 and 4, in the fluid mixing device 10, the outer circumferential surfaces of the valve body portion 20 of the first electric control valve 11 and the valve body portion 27 of the second electric control valve 15 which are arranged in both end portions in the direction of the flow passage axis F are partially exposed to the outside, and by connecting the valve body portion 20 and the valve body portion 27 to both end portions in the direction of the flow passage axis F of the casing body portion 48a of the second casing 48, the outer circumferential surface of the valve body portion 20 and the valve body portion 27 configure a part of the outer circumferential surface of the casing body portion 48a of the second casing 48. Since the valve body portion 20 of the first electric control valve 11 and the valve body portion 27 of the second electric control valve configure a part of the second casing 48 in this manner, it is possible to form the second casing 48 more compactly compared to a case where the casing body portion 48a of the second casing 48 houses the whole of the first electric control valve 11 and the second electric control valve 15 therein.

In the present embodiment, the lid portion 48c is integrally formed with the casing body portion 48a so as to close the upper opening of the casing body portion 48a of the second casing 48. However, the casing body portion 48a and the lid portion 48c of the second casing 48 may be separately formed and joined by means of bolts or the like. The bottom opening of the casing body portion 48a of the second casing 48 is closed by joining the bottom portion 48b, the valve body portion 20 of the first electric control valve 11, and the valve body portion 27 of the second electric control valve 15 to each other by means of bolts and nuts (not shown).

On the inside of the second casing 48 thus configured, there are provided a first driving unit accommodation portion 53 for accommodating the first electric driving unit 11a of the first electric control valve 11, a second driving unit accommodation portion 54 for accommodating the second electric driving unit 15a of the second electric control valve 15, and an electric component accommodation portion 55 for accommodating the concentration measurement control circuit 13c of the concentration measurement unit 13 and the flow rate measurement control circuit 14c of the flow rate measurement unit 14, and partition plates 56, 56 are provided between the first driving unit accommodation portion 53 and the electric component accommodation unit 55 and between the second driving unit accommodation unit 54 and the electric component accommodation unit 55. A heat insulating material for suppressing the transmission of heat among the first driving unit accommodation unit 53, the electric component accommodation unit 55, and the second driving unit accommodation unit 54, or a shielding material such as a metal plate for effectively shielding noise may be attached to the partition plate 56. Further, heat radiation ribs or heat radiation grooves may be provided on the outer circumferential surface of the casing body portion 48a of the second casing 48.

The spatial layer 49a is formed by assembling the lid portion 47c of the first casing 47 and the bottom portion 48b of the second casing 48 together. However, the method of forming the spatial layer 49a is not limited. In the present embodiment, as shown in FIG. 2, three openings 57 for allowing the passage of the wiring of the concentration sensor 13b and the flow rate sensor 14b are provided on the lid portion 47c of the first casing 47 and on the bottom portion 48b of the second casing 48, respectively, such that the openings 57 on the lid portion 47c and the openings 57 on the bottom portion 48b are opposed to each other when the lid portion 47c and the bottom portion 48b are connected to each other, and an annular projection is further formed along a circumferential edge portion of each of openings 57 on one of the lid portion 47c of the first casing 47 and the bottom portion 48b of the second casing 48 so as to protrude toward the other of the lid portion 47c and the bottom portion 48b. According to such a configuration, when the lid portion 47c of the first casing 47 and the bottom portion 48b of the second casing 48 are assembled together, the annular projections on one of the lid portion 47c of the first casing 47 and the bottom portion 48b of the second casing 48 abuts against the other of the lid portion 47c of the first casing 47 and the bottom portion 48b of the second casing 48, and the lid portion 47c of the first casing 47 and the bottom portion 48b of the second casing 48 are held at positions separated from each other, thereby forming the spatial layer 49a.

It is noted that through the above-described three openings 57 provided on the lid portion 47c of the first casing 47 and the bottom portion 48b of the second casing 48, respectively, the concentration sensor 13b and the concentration measurement control circuit 13c, as well as the flow rate sensor 14b, and the flow rate measurement control circuit 14c are electrically connected to each other, respectively, so that the measurement result obtained by the concentration sensor 13b is transmitted to the concentration measurement control circuit 13c, and the measurement result obtained by the flow rate sensor 14b is transmitted to the flow rate measurement control circuit 14c.

When the fluid mixing device 10 is operated, heat is generated from the concentration measurement control circuit 13c and the flow rate measurement control circuit 14c, or the first electric driving unit 11a of the first electric control valve 11 and the second electric driving unit 15a of the second electric control valve 15, and the temperature in the second casing 48 is higher than the surrounding temperature. However, the spatial layer 49a is formed between the first casing 47 and the electric component accommodation unit 55 of the second casing 48 for accommodating the concentration measurement control circuit 13c and the flow rate measurement control circuit 14c, as well as, the spatial layers 49b, 49b are formed between the first casing 48 and the first driving unit accommodation unit 53 of the second casing 48 for accommodating the first electric driving unit 11a of the first electric control valve 11 and between the first casing 48 and the second driving unit accommodation unit 54 of the second casing 48 for accommodating the second electric driving unit 15a of the second electric control valve 15. Therefore, it is possible to prevent heat generated from the concentration measurement control circuit 13c and the flow rate measurement control circuit 14c, or the first electric driving unit 11a of the first electric control valve 11 and the second electric driving unit 15a of the second electric control valve 15, from being transmitted to the concentration sensor 13b or the flow rate sensor 14b. This makes it possible to reduce the influence of heat generated from the concentration measurement control circuit 13c and the flow rate measurement control circuit 14c, or the first electric control valve 11 and the second electric control valve 15 on the concentration sensor 13b or the flow rate sensor 14b. Further, since the temperature change of the mixed fluid due to generated heat can be suppressed, it is possible to suppress the change in properties, such as the viscosity of the mixed fluid, or characteristics, such as a suspension state, thereby stably measuring the accurate concentration and the flow rate. In particular, the fluid mixing device 10 has an excellent effect in a case of supplying a temperature-sensitive mixed fluid to the outside at the accurate concentration and the flow rate.

In order to compensate for the influence of the change in temperature of the mixed fluid on the measured results of the concentration and the flow rate, for example, a temperature sensor 58 may be attached to the outer portion of the measurement pipe 33 of the flow rate measurement unit 14, and the concentration and the flow rate of the mixed fluid may be more accurately obtained by performing the temperature compensation in the concentration measurement control circuit 13c and the flow rate measurement control circuit 14c based on the measured temperature.

Next, the operation of the fluid mixing device 10 will be described.

In the fluid mixing device 10, the first fluid component flows into the first fluid inflow part 17 and the second fluid component flows into the second fluid inflow part (not shown). Here, a case where a high concentration slurry fluid is supplied as a first fluid component, pure water is supplied as a second fluid component, the first fluid component and the second fluid component are mixed with each other to generate a slurry mixed fluid, and the slurry mixed fluid having a predetermined concentration is discharged at a predetermined flow rate from the mixed fluid outflow part 18 will be described. The first fluid component which flows into the coupling element 21 of the first electric control valve 11 serving as the first fluid inflow part 17 passes through the first electric control valve 11 and flows in the main flow passage 12a of the fluid mixing unit 12. Further, the second fluid component which flows in the second fluid inflow part is merged through the branch flow passage 12b with the first fluid component, thereby mixing the first fluid component and the second fluid component to generate the mixed fluid. Since the first electric control valve 11 is a pinch valve and the flow passage constituted by the elastic tube 19 of the first electric control valve 11 extends linearly along the flow passage axis F, the adhesion of the solid component is unlikely to occur, and clogging is unlikely to occur. Further, cleaning also can become easy. The mixed fluid generated in the fluid mixing unit 12 flows into the concentration measurement flow passage 13a of the concentration measurement unit 13 connected to the downstream side of the fluid mixing unit 12 and the conductivity of the mixed fluid is measured by the concentration sensor 13b. The conductivity measured by the concentration sensor 13b is transmitted to the concentration measurement control circuit via the wiring, and the concentration measurement control circuit 13c determines the concentration of the mixed fluid from the measured conductivity of the mixed fluid. Next, the concentration measurement control circuit 13c determines the flow rate of the first fluid component with respect to the flow rate of the second fluid component such that the difference between the determined concentration of the mixed fluid and the predetermined concentration becomes zero, and controls the first electric driving unit 11a of the first electric control valve 11 to drive the pinching element 25 such that the elastic tube 19 of the first opening degree control unit 11b has the valve opening degree that achieves the determined flow rate of the first fluid component. In this way, the flow rate of the first fluid component is changed, the mixing ratio of the first fluid component to the second fluid component is adjusted, and the concentration of the mixed fluid is controlled to a predetermined concentration. It is noted that since the first electric control valve 11 is a pinch valve and the flow passage constituted by the elastic tube 19 of the first electric control valve 11 extends linearly along the flow passage axis F, there is an advantage that the flow rate can be easily controlled.

In a case where the mixed fluid is a slurry fluid, if the flow passage is curved, the mixed fluid stagnates, and the concentration of the mixed fluid is likely to change due to the adhesion of the solid component. However, in the fluid mixing device 10, the main flow passage 12a of the fluid mixing unit 12 and the concentration measurement flow passage 13a of the concentration measurement unit 13 are arranged along the flow passage axis F on a line with each other so that there is no curved portion from the junction of the main flow passage 12a and the branch flow passage 12b of the fluid mixing unit 12 to the concentration sensor 13b, and stagnation is unlikely to occur, and thus, the change in concentration due to the adhesion of the solid component is unlikely to occur. Therefore, it is possible to accurately measure the concentration of the mixed fluid generated in the fluid mixing unit 12, and to accurately control the mixed fluid to a predetermined concentration.

Next, the mixed fluid controlled to the predetermined concentration by the first electric control valve 11, the fluid mixing unit 12, and the concentration measurement unit 13 flows into the flow rate measurement flow passage 14a (measurement pipe 33) of the flow rate measurement unit 14 connected the downstream side of the concentration measurement flow passage 13a of the concentration measurement unit 13. In the flow rate measurement unit 14, the flow rate is measured as follows. The ultrasonic wave is transmitted from the ultrasonic vibrator 36 positioned on the upstream side (the left side in FIG. 5) with respect to the flow of the mixed fluid toward the ultrasonic vibrator 36 positioned on the downstream side (the right side in FIG. 5). The ultrasonic wave received by the ultrasonic vibrator 36 on the downstream side is converted into an electric signal and output to the flow rate measurement control circuit 14c. When the ultrasonic wave is received by the ultrasonic vibrator 36 on the downstream side, the flow rate measurement control circuit 14c instantaneously switches the role of the transmission and reception of the pair of ultrasonic vibrators 36, 36, the ultrasonic wave is transmitted from the ultrasonic vibrator 36 on the downstream side toward the ultrasonic vibrator 36 on the upstream side, and the ultrasonic wave received by the ultrasonic vibrator 36 on the upstream side is converted into the electric signal and output to the flow rate measurement control circuit 14c. At this time, the ultrasonic wave propagates against the flow of the fluid in the measurement pipe. Therefore, the propagation speed of the ultrasonic wave in the fluid becomes slower and the propagation time of the ultrasonic wave becomes longer compared to that when the ultrasonic wave propagates from the upstream side to the downstream side. In the flow rate measurement control circuit 14c, the propagation time is calculated from each electrical signal output from the ultrasonic vibrators 36, 36, respectively, and the flow rate is determined from the difference in propagation time.

Next, the mixed fluid which has passed through the flow rate measurement flow passage 14a (measurement pipe 33) of the flow rate measurement unit 14 flows into the second opening degree control unit 15b of the second electric control valve 15. The flow rate measurement control circuit 14c controls the second electric driving unit 15a of the second electric control valve 15 and drives the pinching element 32 so as to achieve the valve opening degree such that the difference between the flow rate measured in real time and the predetermined flow rate becomes zero. In this way, the flow rate of the mixed fluid which flows out from the second opening degree control unit 15b is controlled to a predetermined flow rate. Since the second electric control valve 15 is a pinch valve and the flow passage constituted by the elastic tube 26 of the second electric control valve 15 extends linearly along the flow passage axis F, there is an advantage that the flow rate can be easily controlled. Further, similar to the elastic tube 19 of the first electric control valve 11, the main flow passage 12a of the fluid mixing unit 12, and the concentration measurement flow passage 13a of the concentration measurement unit 13, the measurement pipe 33 of the flow rate measurement unit 14, that is, the flow rate measurement flow passage 14a, and the elastic tube 26 of the second electric control valve 15 are also arranged along the flow passage axis F on a line with each other, there is no curved portion, the stagnation is unlikely to occur, and thus, the change in concentration of the mixed fluid due to the adhesion of the solid component is unlikely to occur. Therefore, without causing the change in concentration in the mixed fluid controlled to a predetermined concentration on the upstream side of the flow rate measurement unit 14, it is possible to supply the mixed fluid controlled to the predetermined concentration with high accuracy to the outside at a predetermined flow rate.

Furthermore, during the operation of the fluid mixing device 10, heat is generated from the concentration measurement control circuit 13c and the flow rate measurement control circuit 14c, and thus, the temperature in the electric component accommodation unit 55 of the second casing 48 is higher than the surrounding temperature. However, since the spatial layer 49a is formed between the second casing 48 for accommodating the concentration measurement control circuit 13c and the flow rate measurement control circuit 14c and the first casing 47 for accommodating the fluid mixing unit 12, the concentration measurement flow passage 13a and the concentration sensor 13b of the concentration measurement unit 13, and the flow rate measurement flow passage 14a (measurement pipe 33) and the flow rate sensor 14b of the flow rate measurement unit 14, it is possible to prevent heat generated from the concentration measurement control circuit 13c and the flow rate measurement control circuit 14c, from being transmitted to the fluid mixing unit 12, the concentration measurement flow passage 13a and the concentration sensor 13b of the concentration measurement unit 13, and the flow rate measurement flow passage 14a and the flow rate sensor 14b of the flow rate measurement unit 14. Therefore, it is possible to reduce the influence of heat generated from the concentration measurement control circuit 13c and the flow rate measurement control circuit 14c on the mixed fluid as well as the concentration sensor 13b, and the flow rate sensor 14b.

Similarly, since heat is also generated from the first electric control valve 11 and the second electric control valve 15, the temperature in the first driving unit accommodation unit 53 and the second driving unit accommodation unit 54 of the second casing 48 is higher than the surrounding temperature. However, since the spatial layers 49b, 49b are formed between the first casing 47 and the first driving unit accommodation unit 53 for accommodating the first electric driving unit 11a of the first electric control valve 11 and between the first casing 47 and the second driving unit accommodation unit 54 for accommodating the second electric driving unit 15a of the second electric control valve 15, it is possible to prevent heat generated from the first electric driving unit 11a and the second electric driving unit 15a, from being transmitted to the fluid mixing unit 12, the concentration measurement flow passage 13a and the concentration sensor 13b of the concentration measurement unit 13, and the flow rate measurement flow passage 14a (measurement pipe 33) and the flow rate sensor 14b of the flow rate measurement unit 14. Therefore, it is possible to reduce the influence of heat generated from the first electric driving unit 11a and the second electric driving unit 15a on the mixed fluid as well as the concentration sensor 13b and the flow rate sensor 14b.

Further, since the side surface of the valve body portion 20 of the first electric control valve 11 and the side surface of the valve body portion 27 of the second electric control valve 15 are exposed to the outside from the second casing 48, it is easy to find the leakage of the fluid from the first opening degree control unit 11b and the second opening degree control unit 15b and it is possible to suppress the influence of fluid leakage on the surrounding environment.

While the fluid mixing device 10 according to the present invention has been described above with reference to the shown embodiment, the present invention is not limited to the shown embodiment. In the above-described embodiment, the concentration measurement unit 13, the flow rate measurement unit 14, and the second electric control valve 15 are arranged in series in this order on the downstream side of the fluid mixing unit 12, and the flow passages thereof are connected. However, it is possible to exchange the orders of the concentration measurement unit 13, the flow rate measurement unit 14, and the second electric control valve 15 to each other as long as the concentration measurement unit 13, the flow rate measurement unit 14, and the second electric control valve 15 are arranged on the downstream side of the fluid mixing unit 12. For example, the second electric control valve 15 may be arranged on the downstream side of the fluid mixing unit 12, the elastic tube 26 of the second electric control valve 15 may be connected to the downstream side of the main flow passage 12a of the fluid mixing unit 12, the flow rate measurement unit 14 may be arranged on the downstream side of the second electric control valve 15, and the flow rate measurement flow passage 14a of the flow rate measurement unit 14 may be connected to the downstream side of the elastic tube 26 of the second electric control valve 15. Further, although electric pinch valves are used as the mixing ratio control unit 2 and the flow rate control unit 6, the mixing ratio control unit 2 and the flow rate control unit 6 are not limited thereto, and for example, instead of the electric pinch valve, air-driven or mechanically-driven pinch valve may be used. Instead of the pinch valve serving as the mixing ratio control unit 2, it is also possible to use a needle valve or a constant pressure valve. Furthermore, although concentration measurement in the concentration measurement unit 4 is performed based on the measurement of the conductivity of the mixed fluid, other methods may be used.

The invention claimed is:

1. A fluid mixing device comprising:
    a fluid mixing unit mixing different fluid components to generate a mixed fluid;
    a concentration measurement unit measuring a concentration of the mixed fluid;
    a mixing ratio control unit controlling a mixing ratio of the different fluid components in the fluid mixing unit based on the concentration of the mixed fluid measured by the concentration measurement unit;
    a flow rate measurement unit measuring a flow rate of the mixed fluid; and
    a flow rate control unit controlling the flow rate of the mixed fluid based on the flow rate of the mixed fluid measured by the flow rate measurement unit,
    wherein the concentration measurement unit, the flow rate measurement unit, and the flow rate control unit are arranged on a downstream side of the fluid mixing unit, so that the mixed fluid generated in the fluid mixing unit is supplied to an outside through the concentration measurement unit, the flow rate measurement unit, and the flow rate control unit, said flow rate control unit comprising a pinch valve having an elastic tube, said elastic tube being arranged to extend along a flow passage axis on a line with a flow passage of the concentration measurement unit and a flow passage of the flow rate measurement unit,
    the fluid mixing unit includes a main flow passage extending linearly and a branch flow passage joining the main flow passage, and the mixing ratio control unit controls a mixing ratio of a first fluid component supplied to the main flow passage and a second fluid component supplied to the branch flow passage by controlling a flow rate of the first fluid component or a flow rate of the second fluid component, said main flow passage being arranged to extend along the flow passage axis on a line with the flow passage of the concentration measurement unit, the flow passage of the flow rate measurement unit and the elastic tube of the flow rate control unit, and
    the mixing ratio control unit comprises a pinch valve having an elastic tube.

2. The fluid mixing device according to claim 1, wherein the first fluid component is a slurry component and the second fluid component is at least one of a diluent and an additive.

3. The fluid mixing device according to claim 1, wherein the elastic tube of the flow rate control unit is connected to a downstream side of the flow passage of the flow rate measurement unit.

4. The fluid mixing device according to claim 1, wherein the flow rate measurement unit is an ultrasonic flow meter measuring a flow rate by ultrasonic waves.

5. The fluid mixing device according to claim 4, wherein the flow rate measurement unit includes a measurement pipe configuring the flow passage of the flow rate measurement unit, and a pair of ultrasonic vibrators provided on an outer circumferential portion of the measurement pipe so as to be spaced apart from each other in a flow passage axis direction, said flow rate measurement unit determining a flow velocity of the mixed fluid by receiving an ultrasonic vibration transmitted from one of the pair of ultrasonic vibrators through the mixed fluid in the measurement pipe with the other of the pair of ultrasonic vibrators, alternately switching between the ultrasonic vibrator on a transmitting side and the ultrasonic vibrator on a receiving side, and measuring an ultrasonic wave propagation time between the pair of ultrasonic vibrators.

6. The fluid mixing device according to claim 1, wherein the elastic tube of the mixing ratio control unit is connected to an upstream side of the main flow passage of the fluid mixing unit, and the elastic tube of the mixing ratio control unit and the main flow passage of the fluid mixing unit are arranged to extend along the flow passage axis on a line with each other.

7. The fluid mixing device according to claim 6, wherein the first fluid component is a slurry component and the second fluid component is at least one of a diluent and an additive.

8. The fluid mixing device according to claim 6, wherein the elastic tube of the flow rate control unit is connected to a downstream side of the flow passage of the flow rate measurement unit.

9. The fluid mixing device according to claim 6, wherein the flow rate measurement unit is an ultrasonic flow meter measuring a flow rate by ultrasonic waves.

10. The fluid mixing device according to claim 9, wherein the flow rate measurement unit includes a measurement pipe configuring the flow passage of the flow rate measurement unit, and a pair of ultrasonic vibrators provided on an outer circumferential portion of the measurement pipe so as to be spaced apart from each other in a flow passage axis direction, said flow rate measurement unit determining a flow velocity of the mixed fluid by receiving an ultrasonic vibration transmitted from one of the pair of ultrasonic vibrators through the mixed fluid in the measurement pipe with the other of the pair of ultrasonic vibrators, alternately switching between the ultrasonic vibrator on a transmitting side and the ultrasonic vibrator on a receiving side, and measuring an ultrasonic wave propagation time between the pair of ultrasonic vibrators.

11. A fluid mixing device comprising:
a fluid mixing unit mixing different fluid components to generate a mixed fluid;
a concentration measurement unit measuring a concentration of the mixed fluid;
a mixing ratio control unit controlling a mixing ratio of the different fluid components in the fluid mixing unit based on the concentration of the mixed fluid measured by the concentration measurement unit;
a flow rate measurement unit measuring a flow rate of the mixed fluid; and
a flow rate control unit controlling the flow rate of the mixed fluid based on the flow rate of the mixed fluid measured by the flow rate measurement unit,
wherein the concentration measurement unit, the flow rate measurement unit, and the flow rate control unit are arranged on a downstream side of the fluid mixing unit, so that the mixed fluid generated in the fluid mixing unit is supplied to an outside through the concentration measurement unit, the flow rate measurement unit, and the flow rate control unit, said flow rate control unit comprising a pinch valve having an elastic tube, said elastic tube being arranged to extend along a flow passage axis on a line with a flow passage of the concentration measurement unit and a flow passage of the flow rate measurement unit, and
the flow rate measurement unit is an ultrasonic flow meter measuring a flow rate by ultrasonic waves.

12. The fluid mixing device according to claim 11, wherein the flow rate measurement unit includes a measurement pipe configuring the flow passage of the flow rate measurement unit, and a pair of ultrasonic vibrators provided on an outer circumferential portion of the measurement pipe so as to be spaced apart from each other in a flow passage axis direction, said flow rate measurement unit determining a flow velocity of the mixed fluid by receiving an ultrasonic vibration transmitted from one of the pair of ultrasonic vibrators through the mixed fluid in the measurement pipe with the other of the pair of ultrasonic vibrators, alternately switching between the ultrasonic vibrator on a transmitting side and the ultrasonic vibrator on a receiving side, and measuring an ultrasonic wave propagation time between the pair of ultrasonic vibrators.

* * * * *